United States Patent
Smith et al.

(10) Patent No.: US 10,233,733 B2
(45) Date of Patent: Mar. 19, 2019

(54) CROSSOVER TOOL, METHOD OF MAKING A CROSSOVER TOOL AND TWO PARTS OF A TWO-PART CROSSOVER TOOL

(71) Applicants: James A. Smith, Manvel, TX (US); Robert S. O'Brien, Katy, TX (US)

(72) Inventors: James A. Smith, Manvel, TX (US); Robert S. O'Brien, Katy, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 749 days.

(21) Appl. No.: 14/490,997

(22) Filed: Sep. 19, 2014

(65) Prior Publication Data
US 2016/0084046 A1    Mar. 24, 2016

(51) Int. Cl.
E21B 43/04 (2006.01)
E21B 43/26 (2006.01)
E21B 43/14 (2006.01)
E21B 41/00 (2006.01)

(52) U.S. Cl.
CPC ............ E21B 43/045 (2013.01); E21B 43/26 (2013.01); *E21B 41/0078* (2013.01); *E21B 43/14* (2013.01)

(58) Field of Classification Search
CPC .... E21B 43/045; E21B 43/26; E21B 41/0078; E21B 43/14
See application file for complete search history.

(56) References Cited

U.S. PATENT DOCUMENTS

| | | | |
|---|---|---|---|
| 5,636,691 A * | 6/1997 | Hendrickson | E21B 17/1085 166/222 |
| 6,227,303 B1 * | 5/2001 | Jones | E21B 43/08 166/231 |
| 6,491,097 B1 | 12/2002 | Oneal et al. | |
| 7,185,704 B2 | 3/2007 | Bigelow et al. | |
| 8,215,395 B2 | 7/2012 | Clem et al. | |
| 8,371,369 B2 | 2/2013 | Clem et al. | |
| 2006/0191685 A1 * | 8/2006 | Coronado | E21B 43/045 166/278 |
| 2009/0255667 A1 * | 10/2009 | Clem | E21B 43/26 166/242.4 |
| 2011/0132603 A1 * | 6/2011 | Martinez | E21B 17/1085 166/275 |
| 2013/0008652 A1 * | 1/2013 | Broussard | E21B 33/124 166/278 |

* cited by examiner

*Primary Examiner* — Blake E Michener
*Assistant Examiner* — Christopher J Sebesta
(74) *Attorney, Agent, or Firm* — Cantor Colburn LLP

(57) ABSTRACT

A cross over tool includes, a first tubular forming part of a structure having a channel formed radially through a wall thereof and having a passageway formed longitudinally through the wall. The tool includes a second tubular forming part of a tool string, the second tubular is positionable radially of the first tubular, and has a port through a wall thereof, the port is alignable with the channel. The crossover tool is configured such that while the a port is aligned with the a channel fluid can flow through an inside of the tool string radially through the a port and the a channel and back into the inside of the tool string and through the a passageway and through an annular space defined between the tool string and the structure.

16 Claims, 3 Drawing Sheets

CROSSOVER TOOL, METHOD OF MAKING A CROSSOVER TOOL AND TWO PARTS OF A TWO-PART CROSSOVER TOOL

BACKGROUND

Tubular operations sometimes require that slurry including abrasive particles such as gravel or proppant be pumped through tubular systems. Such slurries can also be pumped out of tubulars in such operations through ports formed in walls of the tubulars. Conventional systems handle such conditions as designed; however, those skilled in the art are always interested in new systems and methods that may advance the art.

BRIEF DESCRIPTION

Disclosed herein is a crossover tool. The cross over tool includes, a first tubular forming part of a structure, the first tubular having at least one channel formed radially through a wall of the first tubular and having at least one passageway formed longitudinally through at least a portion of the wall of the first tubular. The cross over tool also includes, a second tubular forming part of a tool string, the second tubular is positionable radially of the first tubular, and has at least one port through a wall of the second tubular, the at least one port is alignable with the at least one channel, the first tubular is also maintainable within the structure while the second tubular is removable from the first tubular and the structure. The crossover tool is further configured such that while the at least one port is aligned with the at least one channel fluid can flow through an inside of the tool string radially through the at least one port and the at least one channel and back into the inside of the tool string and through the at least one passageway and through an annular space defined between the tool string and the structure.

Further disclosed herein is a method of making a crossover tool. The method includes, positioning a first tubular having a channel extending radially through a wall of the first tubular and a passageway extending longitudinally through a portion of the wall of the first tubular within a structure. Removably positioning a tool string including a second tubular having a port through a wall of the second tubular within the structure such that port is aligned with the channel, and establishing fluidic communication between the passageway and an annular space defined between the tool string and the structure such that fluid can flow through an inside of the tool string, radially through the port and the channel and back into the inside of the tool string through the passageway and into an annular space between the tool string and the structure.

Further disclosed is a first part of a two-part crossover tool. The first part of the two-part cross over tool includes, a structure, and a first tubular in operable communication with the structure having at least one channel formed radially through a wall of the first tubular and having at least one passageway formed longitudinally through a portion of the wall of the first tubular. The first part of the two-part crossover tool is configured to have a second part of the two-part crossover tool including a tool string and a second tubular removably positionable relative to the first part of the two-part crossover tool to form the two-part crossover tool such that when formed at least one port through a wall of the second tubular aligns with the at least one channel of the first tubular and fluid can flow through an inside of the tool string radially through the at least one port and the at least one channel and back into the inside of the tool string and through the at least one passageway and through an annular space defined between the tool string and the structure.

Still further disclosed herein is a second part of a two-part crossover tool. The second part of a two-part crossover tool includes, a tool string and a second tubular in operable communication with the tool string having at least one port through a wall of the second tubular. The second part of the two-part crossover tool is configured to be removably positionable within a first part of the two-part crossover tool to form the two-part crossover tool such that when formed at least one port through a wall of the second tubular aligns with the at least one channel of the first tubular and fluid can flow through an inside of the tool string radially through the at least one port and the at least one channel and back into the inside of the tool string and through the at least one passageway and through an annular space defined between the tool string and the structure.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
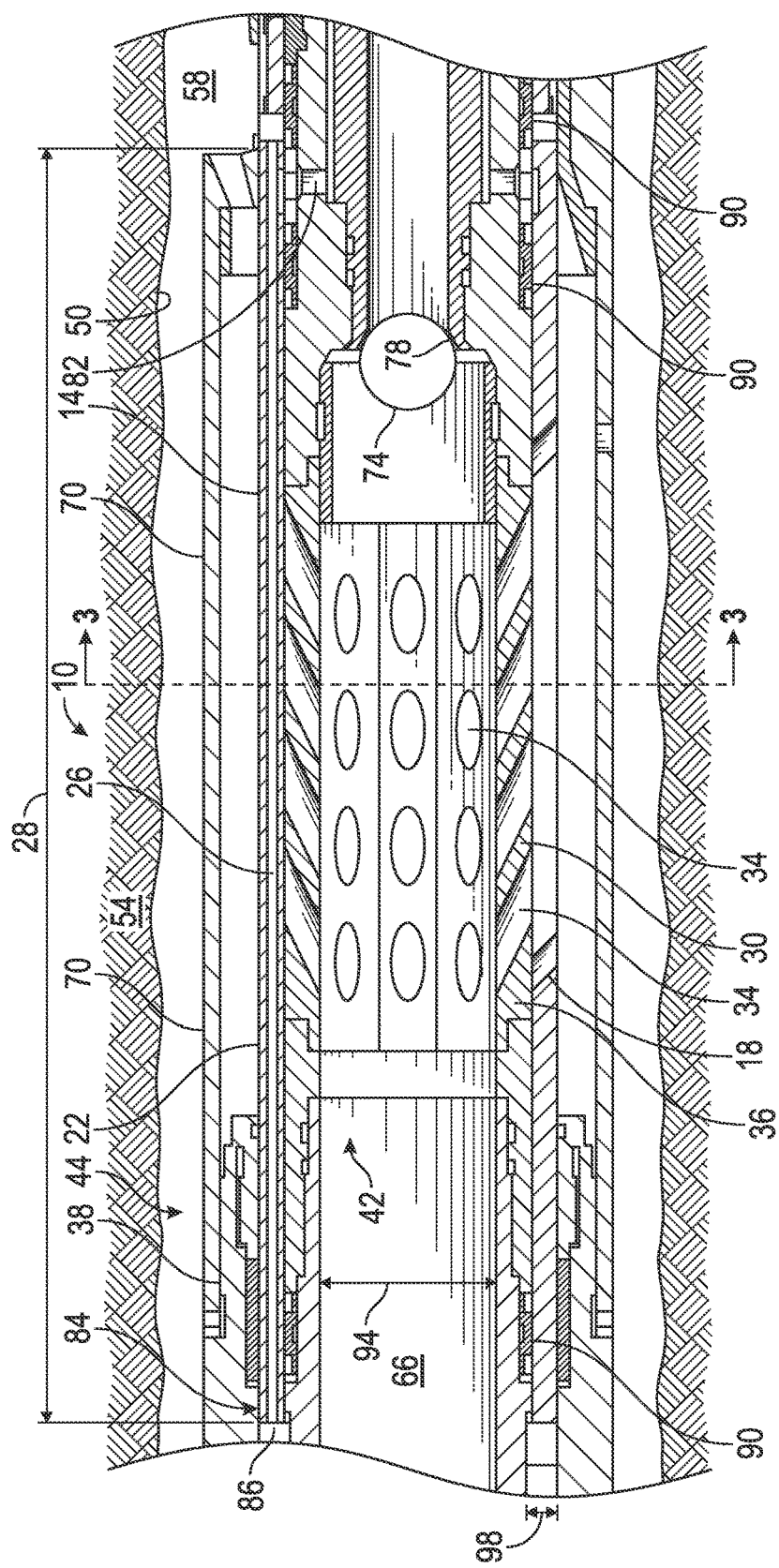
FIG. 1 depicts a cross sectional view of a crossover tool disclosed herein.
Figure 2:
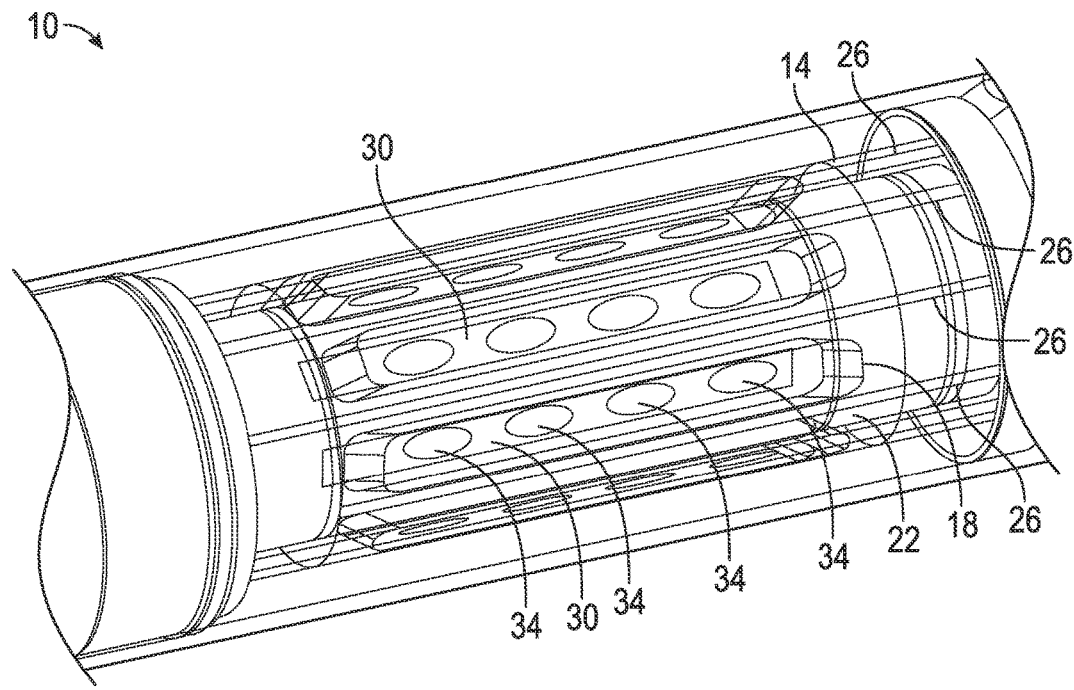
FIG. 2 depicts a perspective view of the crossover tool of FIG. 1 with a tubular shown as partially transparent.
Figure 3:
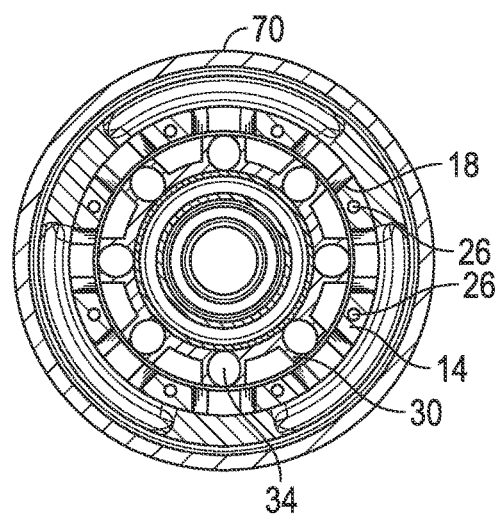
FIG. 3 depicts a cross sectional view of the crossover tool of FIG. 1 taken at arrows 3-3.

Referring to FIGS. 1-3, an embodiment of a crossover tool disclosed herein is illustrated at 10. The crossover tool 10 includes, a first tubular 14 having at least one channel 18 (with eight of the channels 18 being distributed perimetrically around the first tubular as illustrated in one embodiment), formed radially through a wall 22 of the first tubular 14 and having at least one passageway 26 (visible in FIG. 2 only), with eight being shown, formed longitudinally through at least a portion 28 of the wall 22. A second tubular 30 is positioned radially of the first tubular 14 and has at least one port 34, with 20 of the ports 34 shown, through a wall 36 of the second tubular 30. The ports 34 are alignable with the channels 18 such that flow through the second tubular 30 is flowable through the ports 34 and through the channels 18. The first tubular 14 is maintainable within and is part of a structure 38 while the second tubular 30 is removable from first tubular 14 and the structure 38.

In an embodiment the second tubular 30 is made of a material, such as carbide, for example, that is more resistant to erosion than a material that the first tubular 14 is made of. As such, the second tubular 30 helps protect the first tubular 14 from erosion. Additional erosion protection is provided by the shape, size and orientation of the ports 34. The ports 34 may be angled to help redirect longitudinal flow within the second tubular 30 to be more radial as it flows through the channels 18. The total flow area through the ports 34 may be less than a flow area through the channels 18 to lessen impingement loads on the first tubular 14 by fluid and particulates in the fluid flowing.

The first tubular 14, in one embodiment, is formed from a single piece of material (at least in a cross sectional area including the channels 18 and the passageways 26) and is configured to structurally support the weight of components suspending therefrom. One method of making the first tubular 14 is to start with a single billet or tube shaped piece of a single material and then machine the channels 18 and gun-drill the passageways 26 therein. Alternate embodiment could include tubes (not shown) of an alternate material such as carbide, for example, that extend through the passageways 26. The addition of such tubes could resist erosion, thereby preventing unwanted fluidic communication even if the material of the first tubular erodes.

Figure 4A:
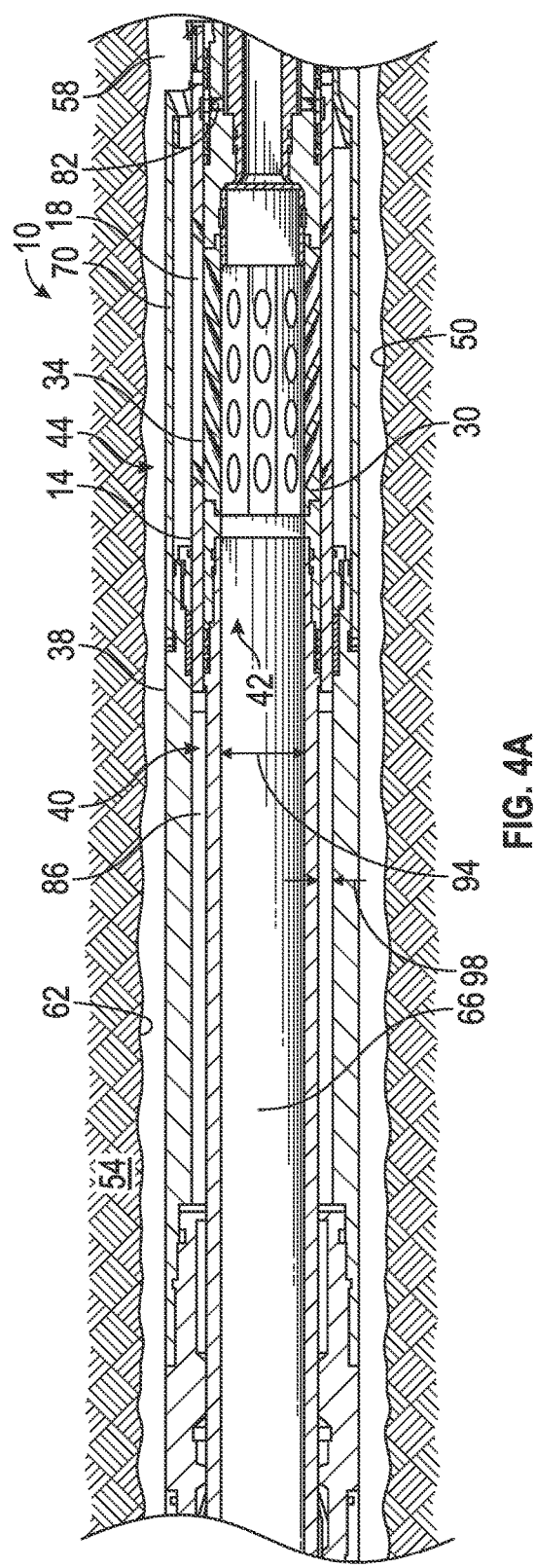
FIGS. 4A and 4B depict a less magnified cross sectional view of the crossover tool of FIG. 1.
Figure 4B:
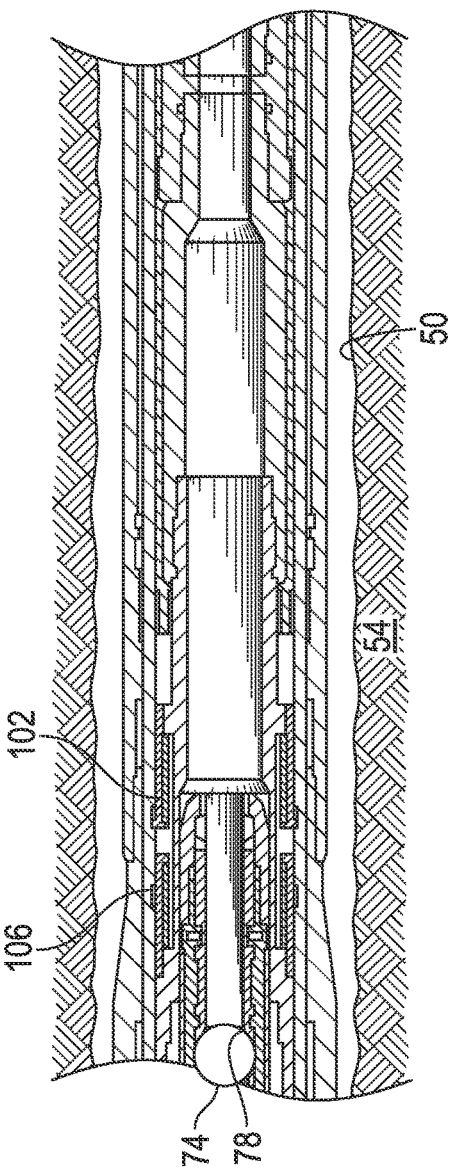

Referring to FIGS. 4A and 4B, in one embodiment a first part 44 of the two-part crossover tool 10 includes the first tubular 14 and the structure 38. The first part 44 which in this embodiment includes sandface equipment is configured to remain located within a borehole 50 in an earth formation 54 such as is used in the hydrocarbon recovery and carbon dioxide sequestration industries, for example. A second part 42 of the two-part crossover tool 10 includes the tool string 40 and the second tubular 30. The second part 42 is runnable within first part 44 to form the two-part crossover tool 10. The second part 42 is removable from the first part 44. The crossover tool 10 may be used for different purposes. For example, it may be used to gravel pack an annulus 58 defined between walls 62 of the borehole 50 and the structure 38. In such an application a gravel slurry flows downhole through the inside 66 of the second tubular 30 radially out through the ports 34 and the channels 18 impinges on a shield 70 such as a liner, for example, and then downhole through the annulus 58. A plug 74 can be run and sealed against a seat 78 to prevent slurry from flowing further downhole through the inside 66 of the tool string 40 past the plug 74. As gravel packs the annulus 58 return fluid (substantially without gravel) flows uphole from downhole of at least a portion of the structure 38 and is redirected by the plugged seat 78 to flow through openings 82 that are fluidically connected to the passageways 26.

Ends 84 of the passageways 26 are fluidically connected to an annular space 86 defined between the tool string 40 and the structure 38 when the ports 34 are aligned with the channels 18. A plurality of seals 90, sealingly engaged to the tool string 40 and the structure 38 (possibly the first tubular 14 directly), separate the foregoing flow paths and prevent contamination in the slurry from entering areas where it could potentially cause leakage and malfunction of the arrangement 10. In one embodiment, a flow area of the inside 66 of tool string 40 at and uphole of the second tubular 30 is larger than conventional systems that do not form the annular space 86 between relative moving parts such as the tool string 40 and the structure 38, for return flow. Such conventional systems typically define an annular return flow path between two concentric tubulars attached as part of a removable string. These conventional devices therefore have an extra tubular positioned between what in this device are the tool string 40 and the structure 38. This extra tubular consumes radial dimensions that are not consumed in the crossover tool 10 disclosed herein. As such, the crossover tool 10 can have a larger inner radial dimension 94 of the tool string 40 and/or a larger annular radial dimension 98 between the tool string 40 and the structure 38 than conventional devices. The large inner radial dimension 94 forms a large flow area that allows for greater volumetric flow velocities of slurry therethrough with less erosion and longer operational life spans of the tool string 40, than in conventional systems.

The crossover tool 10 can also be employed to fracture the earth formation 54. In such an application the slurry contains proppant for propping open fractures in the formation 54 after it has been fractured. The fracturing can take place by pressure supplied to the formation through the ports 34 and the channels 18. Still other treatments and stimulations of the formation 54 can also be performed with the arrangement 10 including acidizing, for example.

Since the second tubular 30 is removable from its position within the first tubular 14 during removal of the tool string 40 from the structure 38, an orientation mechanism is employed to rotationally align the ports 34 with the channels 18. To facilitate this, one or both of the first tubular 18 and the second tubular 30 is able to rotate relative to the rest of the tool to which it is assembled. In one embodiment, collet fingers 102 on the tool string 40 engage with helical grooves 106 on the structure 38 to cause relative rotation between the first tubular 14 and the second tubular 30 until the ports 34 are rotationally aligned with the channels 18. Alternatively, the specific component on which each of these features is positioned can be reversed while providing the same desired effect.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A crossover tool, comprising:
a first tubular forming part of a structure, the first tubular having at least one channel formed radially through a wall of the first tubular and having at least one passageway formed longitudinally through at least a portion of the wall of the first tubular, wherein the first tubular includes a first alignment feature; and
a second tubular forming part of a tool string, the second tubular being positionable radially of the first tubular, the second tubular being selectively detachable from the first tubular while downhole and having at least one port through a wall of the second tubular, the second tubular including a second alignment feature, the at least one port being rotationally alignable with the at least one channel, the first tubular being maintainable within the structure while the second tubular is removable from the first tubular and the structure, the crossover tool being configured such that while the at least one port is rotationally aligned with the at least one channel through an interaction between the a first alignment feature and the second alignment feature so that fluid can flow through an inside of the tool string radially through the at least one port and the at least one channel and back into the inside of the tool string and through the at least one passageway and through an annular space defined between the tool string and the structure.

2. The crossover tool of claim 1, wherein the structure is positioned within a borehole in an earth formation.

3. The crossover tool of claim 1, further comprising at least one seal that is sealingly engagable between the tool string and the structure to separate at least the annular space from being in fluidic communication directly with at least one of the at least one port or the at least one channel.

4. The crossover tool of claim 3, wherein the at least one seal is three seals at least two of the three seals being axially spaced from one another along the toolstring.

5. The crossover tool of claim 4, wherein return flow flows through the inside of the tool string radially between two of the three seals and into the at least one passageway.

6. The crossover tool of claim 1, wherein a portion of the second tubular having the at least one port is made of a material more resistant to erosion than a material of the first tubular having the at least one channel.

7. The crossover tool of claim 6, wherein the portion of the second tubular is made of carbide.

8. The crossover tool of claim 1, wherein the at least one port redirects longitudinal flow to be more radial.

9. The crossover tool of claim 1, wherein the flow is a slurry.

10. The crossover tool of claim 1, wherein the at least one port is a plurality of ports distributed perimetrically about the second tubular and the at least one channel is a plurality of channels distributed perimetrically about the first tubular.

11. The crossover tool of claim 1, wherein at least one of the first alignment feature and the second alignment feature defines a helical groove.

12. The crossover tool of claim 1, wherein a seat disposed at the second tubular when plugged by a plug causes longitudinal flow through the second tubular to flow outward through the at least one port.

13. A method of making a crossover tool, comprising:
positioning a first tubular having a first alignment feature and at least one channel extending radially through a wall of the first tubular and at least one passageway extending longitudinally through at least a portion of the wall of the first tubular within a structure;
removably positioning a tool string including a second tubular having a second alignment feature and at least one port through a wall of the second tubular within the structure such that the at least one port is rotationally aligned with the at least one channel through an interaction between the a first alignment feature and the second alignment feature, the second tubular being removable from the structure while downhole; and
establishing fluidic communication between the at least one passageway and an annular space defined between the tool string and the structure such that fluid can flow through an inside of the tool string, radially through the at least one port and the at least one channel and back into the inside of the tool string through the at least one passageway and into an annular space between the tool string and the structure.

14. The method of making a crossover tool of claim 13, further comprising positioning the structure within a borehole in an earth formation.

15. The method of making a crossover tool of claim 14, further comprising disposing a seat at the tool string below the at least one port.

16. The method of making a crossover tool of claim 15, further comprising fluidically connecting an inside of the second tubular below the seat to the at least one passageway.

* * * * *